United States Patent [19]

Caragata

[11] Patent Number: 4,669,304
[45] Date of Patent: Jun. 2, 1987

[54] CRITICAL WIND DIRECTION INDICATOR

[76] Inventor: John P. Caragata, Site 8, Box 9, R.R. 2, Sexsmith, Alberta, Canada

[21] Appl. No.: 798,928

[22] Filed: Nov. 18, 1985

[51] Int. Cl.$^4$ ............................................. G01P 13/02
[52] U.S. Cl. ..................................................... 73/188
[58] Field of Search ................... 73/188, 189; 116/173

[56] References Cited

U.S. PATENT DOCUMENTS

| | | | |
|---|---|---|---|
| 1,736,109 | 11/1929 | Barton | 73/189 |
| 2,467,374 | 4/1949 | Findlater | 73/188 |
| 3,359,795 | 12/1967 | Walsh | 73/189 |
| 4,553,430 | 11/1985 | Behrens | 73/188 |
| 4,558,862 | 12/1985 | Kelly | 73/188 X |

Primary Examiner—Charles A. Ruehl
Attorney, Agent, or Firm—Bachman & LaPointe

[57] ABSTRACT

A wind indicator includes a diaphragm which defines a wind passage, the diaphragm is responsive to wind pressure to vary the effective size of the wind passage depending on the velocity of the wind, and vane means are connected to the diaphragm in a position to receive wind passing through the wind passage and responsive to wind direction to maintain the wind passage facing windward; the indicator will show the direction of the wind at very low wind velocity as well as at high wind velocity and is especially useful in areas likely to be invaded by toxic gas.

5 Claims, 8 Drawing Figures

CRITICAL WIND DIRECTION INDICATOR

BACKGROUND OF THE INVENTION

1. Field of the Invention

This invention relates to a critical wind direction indicator.

More particularly, the invention relates to an indicator of the type which shows the direction of the wind at extremely low wind velocity as well as at high velocity. It is particularly useful in areas likely to be invaded by toxic gas, for example, $H_2S$, as a warning to people to vacate these areas. This is a common problem in the oil fields of Western Canada.

SUMMARY OF THE INVENTION

An aim of the invention is to provide an indicator which operates at low wind velocities of as little as one mile per hour and, at the same time, is effective at high wind velocities of, say, 100 miles per hour.

Broadly speaking, a device according to the invention includes a frame and diaphragm means on the frame, providing a wind passage, which enlarges and contracts with the velocity of the wind. Vane means is connected to the frame and extends to leeward so as to receive the wind from the passage.

More specifically, the frame is made up of a circular windward hoop and a smaller leeward ring concentrically arranged with the hoop and appropriate connecting framework. A support extends from one side to the other of the hoop and mounts a vane which projects to the leeward of the frame. A diaphragm arrangement is draped over the frame to extend from the windward hoop to the leeward ring. This diaphragm may take the form of a flexible fabric slipcover which is normally cylindrical, but provided at its leeward side with an elastic margin so that it is normally drawn in as a pleated skirt against the frame to a substantially frusto-conical shape. The cover is capable of being blown outward towards its cylindrical form so that it provides a wind passage of variable cross-sectional area. The vane is preferably made up of a metal frame to which is fastened a fabric cover.

Alternatively, the diaphragm can be made of a number of tapered strips, for example, of plastic, which are mounted side-by-side with their windward ends tethered to the windward hoop and their leeward ends held together by an elastic ring. The action of this type of device is similar to that of the slipcover type.

In operation, at low wind velocities, the diaphragm is held in against the frame and prevents a minimum wind passage. As the velocity of the wind increases the leeward side of the diaphragm is forced outwards to provide a larger and larger passage for the wind. At low velocity, the wind is concentrated, by the passage, against the vane, so that the latter acts to show the wind direction even at low velocity. When the wind increases the diaphragm opens up to allow the wind to pass through without undue pressure on the structure or on the pole on which it is mounted.

Desirably, the frame is mounted on the end of a pole, desirably on ball bearings, so that it is readily rotatable in response to light wind pressure.

BRIEF DESCRIPTION OF THE DRAWINGS

Having thus generally described the nature of the invention, it will now be referred to in more detail, by reference to the accompanying drawings, which illustrate preferred embodiment, and in which.

DESCRIPTION OF THE PREFERRED EMBODIMENTS

Figure 1:
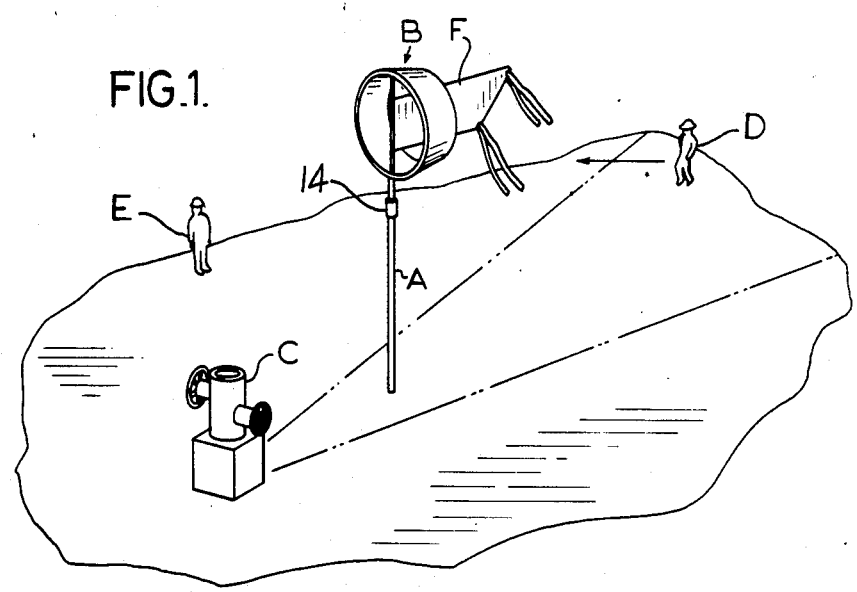
FIG. 1 is a general perspective view of a critical wind direction indicator and mounting pole, according to the invention, mounted between a potential source of noxious gas and a work zone.

Referring to FIG. 1 of the drawings, the wind direction indicator B is shown mounted on a substantially vertical pole A firmly fixed to a base on the ground through a bearing 14, allowing the indicator B to rotate in a substantially horizontal plane. C diagrammatically illustrates a source of noxious gas. A worker D is shown vacating a work zone, which the indicator tells him is downwind from the gas, and E is another operator standing off to the side in a zone which the indicator shows is safe. As will be explained in detail, the indicator B includes a structure providing a passage through which the wind passes, a vane F, leeward of the passage, to keep the passage facing the windward direction, and means which increases or decreases the wind resistance of the device in response to wind velocity.

Figure 2:
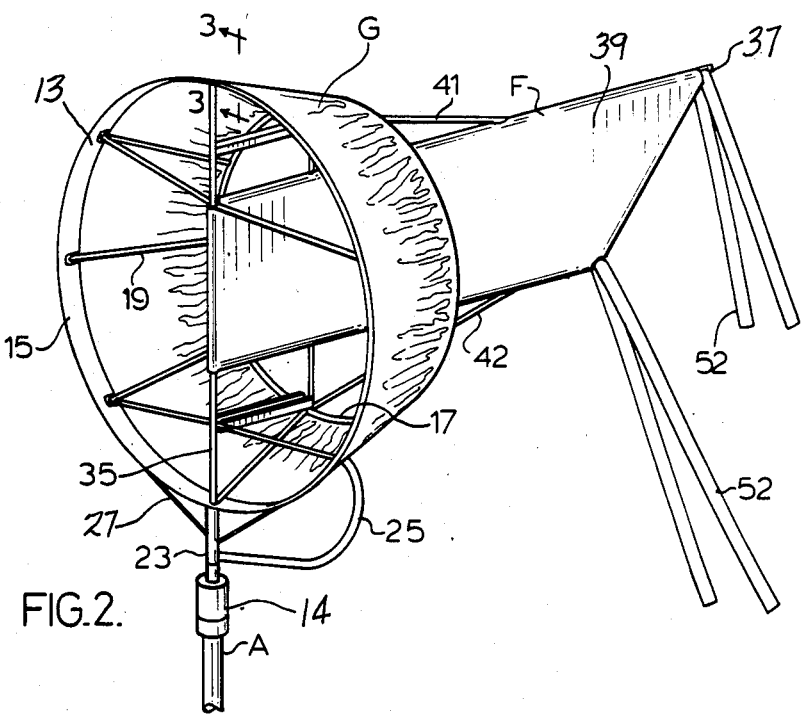
FIG. 2 is a greatly enlarged perspective view of the direction indicator proper and its connection to the pole.

With particular reference to FIG. 2 indicator B is made up of a support frame 13 having a narrow frusto-conical hoop 15 disposed in a substantially vertical plane. The hoop 15 carries a framework made up of an internal ring 17, concentric with the hoop 15, but of smaller diameter, and spaced from it. The ring 17 is connected to the hoop 15 by a series of struts 19 extending diagonally inward and forward from the edge of the hoop 15 to join the ring 17.

A connecting rod 23 is joined to the bottom of the ring 15 and is journalled in the bearing 14. A stabilizing support member 25 extends forwardly and downwardly between the bottom of the ring 17 and a mid-part of the rod 23. A supporting strut 27 extends from each side of the rod 23 diagonally upwards to engage the hoop 15.

Figure 4:
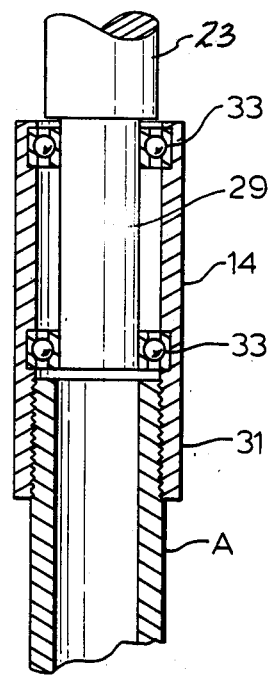
FIG. 4 is a further enlarged fragmentary elevation, partly in section, showing the mounting of the direction indicator proper on the pole.

The bearing 14 is mounted on the post A, as best shown in FIG. 4. The bearing 14 is made up of a sleeve 31 engaging the top of the post A, for example, by a threaded connection, as shown. The connecting rod 23 has a lower end 29 of reduced section which enters the sleeve 31 where it is engaged by ball bearings 33 mounted inside the sleeve 31. Other types of mountings could be used to allow the connecting rod 23 to rotate relative to the post A.

Extending from the top to the bottom of the hoop 15 is a mounting rod 35 on which there is mounted the inner end of a vane F having an extensive surface disposed in a vertical plane, as best shwon in FIG. 2. Struts 41 and 42 extend outwardly from the ring 17 to engage the top and bottom of the vane F, so as to support it relative to the frame.

The vane F is made up of a wire frame 37 on which there is mounted a fabric panel 39 to provide a wind-influenced surface acting to maintain the vane F pointing in the direction the wind is blowing.

Indicating streamers 52 are connected to the top and bottom front edges of the vane F.

Figure 3:
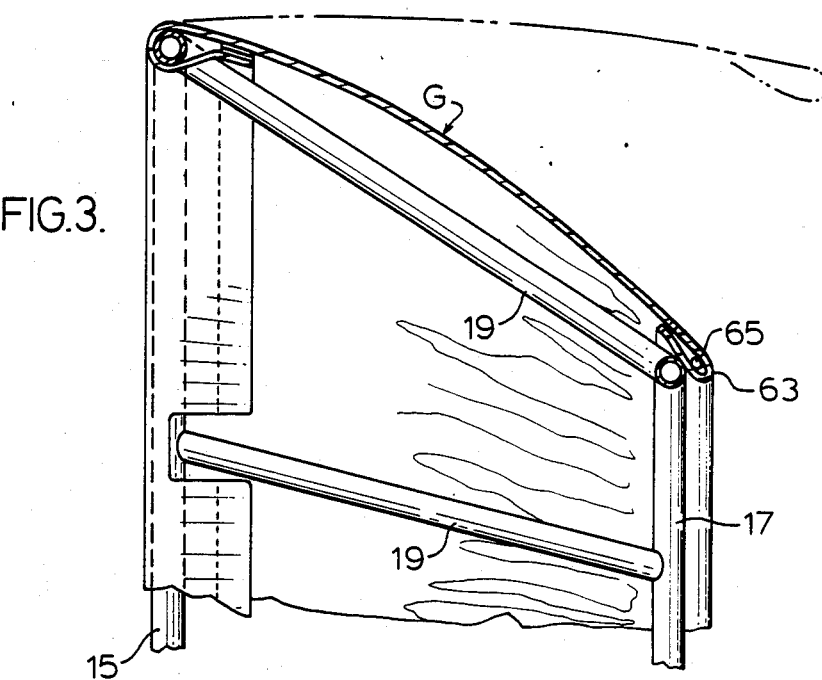
FIG. 3 is a side elevation of the structure shown in FIG. 2 on a further enlarged scale.

Extending about the hoop 15 is one margin of a narrow tubular slipcover or wind-resistance member G defining a diaphragm, made up of flexible fabric, whose other margin 63 contains an elastic 65 which gathers that side of the cover inwards in pleats against the ring 17 and struts 19, as best shown in FIG. 3. The support frame 13 and cover G provide a wind passage leading to the vane F. Preferably the cover G protrudes just beyond the ring 17.

Operation

In operation the wind blows through the passage formed inside the hoop 15 and cover G, the margin 63 defining a leeward outlet to the wind passage. The wind blowing against the vane F causes the latter to rotate into alignment with the wind direction.

Figure 5:
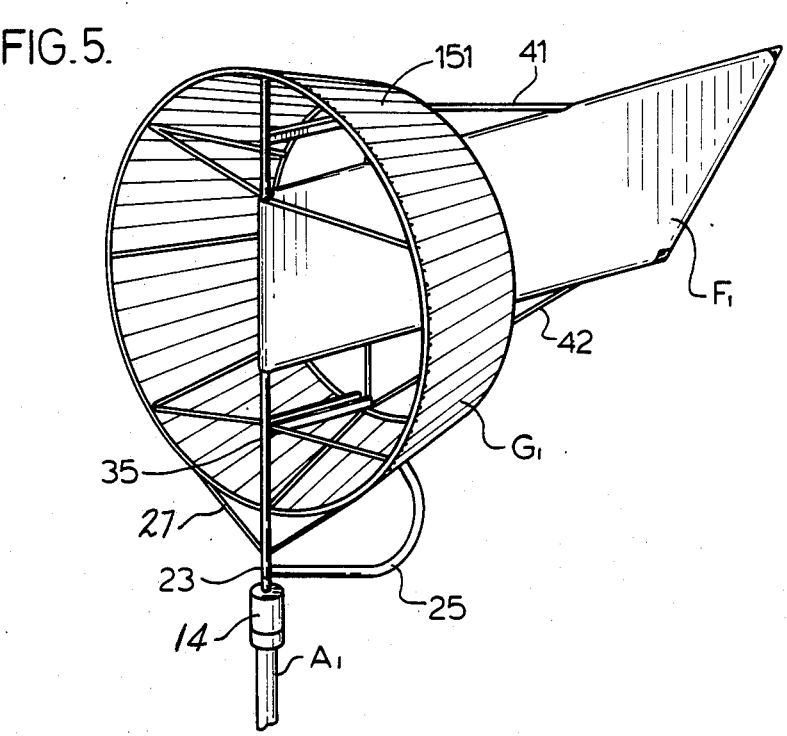
FIG. 5 is a general perspective view, on more or less the scale of FIG. 2, illustrating another form of wind-resistance element or diaphragm.

In operation, in a light wind, the cover G will remain with its margin 63 in a gathered in position, more or less as shown in full lines in FIGS. 3 and 5 and will concentrate the wind passing within the wind passage defined by the diaphragm on the vane F.

As the wind becomes stronger, it forces the inner end of the leeward side of the wind resistant member G outwards so that it offers less resistance to wind going through the passage. This reduces the pressure that would otherwise be exerted on the indicating device B, its connecting rod 23, bearing 14, and pole A.

Figure 6:
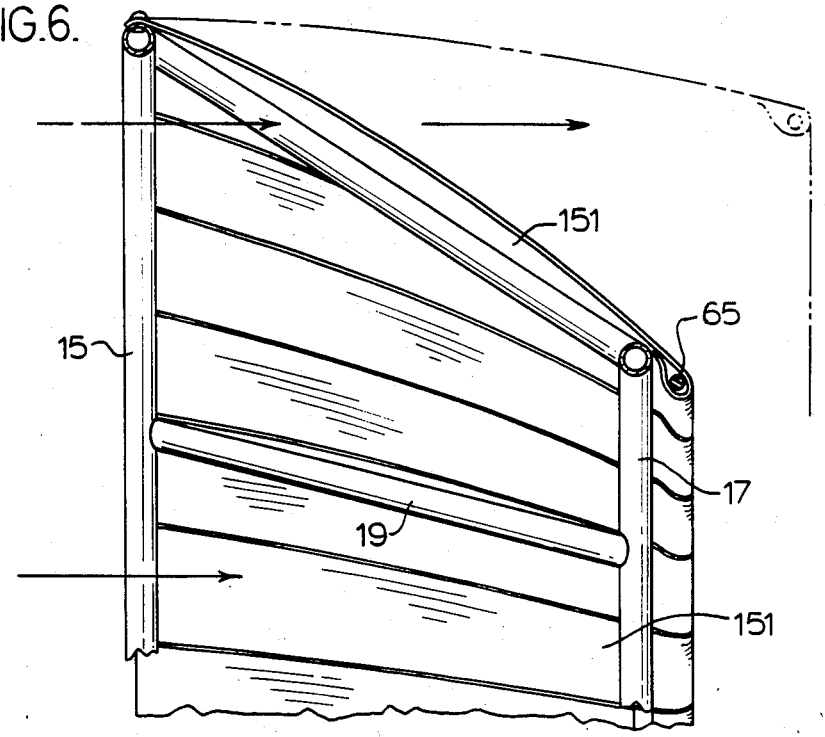
FIG. 6 is a vertical fragmentary cross-section, partly in elevation, substantially on the scale of FIG. 3 of the form of device of FIG. 5

FIGS. 5 and 6 illustrate an alternate form of wind resistance element $G_1$, mounted on a frame similar to that illustrated in the previous Figures. In FIGS. 5 and 6, the reference numerals identifying the similar parts are the same as those in FIGS. 1 to 4 and the letters the same with a subscript 1.

The element $G_1$ is made up of a number of side-by-side plastic strips 151 each of which has a windward end connected to a hoop 15 and a leeward end connected to a common elastic band 65.

The strips 151 are slightly tapered from the windward end to the leeward end so that when they are in the position shown in FIG. 5 and in full lines in FIG. 6, their edges touch and the assembly of plastic strips forms a substantially frustoconical tube.

When the wind becomes strong enough against element $G_1$, the leeward ends of the strips are moved outwards with the elastic 65 stretching until there is a gap between respective strips which widens as it reaches the leeward end of the element $G_1$.

Reaction of the element $G_1$ is thus similar to that of the member G. At low wind pressures the element $G_1$ remains in the position shown in FIG. 5 with the end of the element $G_1$ resting against the frame and presenting a throat to tunnel the wind centrally and increase its velocity as it acts on the vane $F_1$. As the wind rises beyond a predetermined point the wind pressure starts to force the strips outward both enlarging the throat at the windward end of the element $G_1$ allowing more wind to pass and also allowing the wind to escape between the respective strips.

The strips 151 have been shown held to the hoop 15 by fasteners. Alternatively, the strips could be held by rings extending around the hoop 15 and through the margins of the strips. The fabric cover of member G could be similarly connected.

Variable Factors

To give an idea of a practical device, normally the hoop 15 would have a diameter of about 24 inches and the ring 17 about 16 inches with about 6 inches therebetween. The frame can be made of aluminum, although steel or brass could be used. The size and nature of the mounting pole A can vary. The device could be mounted on top of a building or a vehicle. The pole A could be of steel pipe from $\frac{1}{4}$ to $1\frac{1}{2}$ inches depending on the circumstances. The pole A should be sufficiently strong so that the indicator B is kept level to give an accurate reading. The fact that the indicator B offers less resistance at high wind velocity lessens the strain on the pole A.

The material of the diaphragm or member G is preferably fluorescent woven fabric, desirably nylon. The material must be flexible and elastic to allow it to billow out and straighten out the pleats when subjected to high wind pressure.

The ribbons 52 on the leeward end of the vane F give a rough visual estimate of the velocity of the wind.

The wind direction indicator B is preferably spaced from the ground an average of 15 or 20 feet but can be anywhere from 10 to 100 feet or even higher, say, 150 feet, if on the top of a drilling rig. $H_2S$ is heavier than air and will make its way towards the ground so it may be desirable to have the indicator B 20 to 25 feet above the ground. It could be mounted on a 400 barrel production tank.

The alternative form of diaphragm or element $G_1$ can be made of any suitable material with a flexible plastic material preferred.

Desirably the vane F and the diaphragms G and $G_1$ are fluorescent so as to be clearly visible.

The frabric panel 39 of vane F can be fluorescent orange or red sail cloth which can be held in place by strips of VELCRO (trade mark), snaps or buttons.

Figure 7:
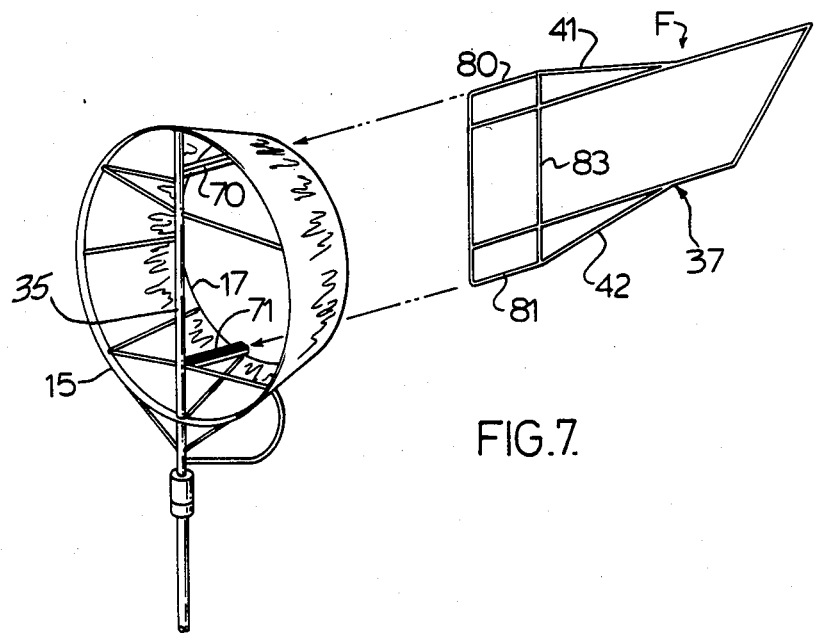
FIGS. 7 and 8 illustrate a preferred structure for connecting the frame and vane.

FIG. 7 is a side elevation, partly in section, showing a preferred arrangement for detachably securing the vane F to the frame. A pair of spaced-apart parallel channel members or troughs 70 and 71 extend between the leeward ring 17 and mounting rod 35 extending from the top to the bottom of the windward ring 15.

Figure 8:
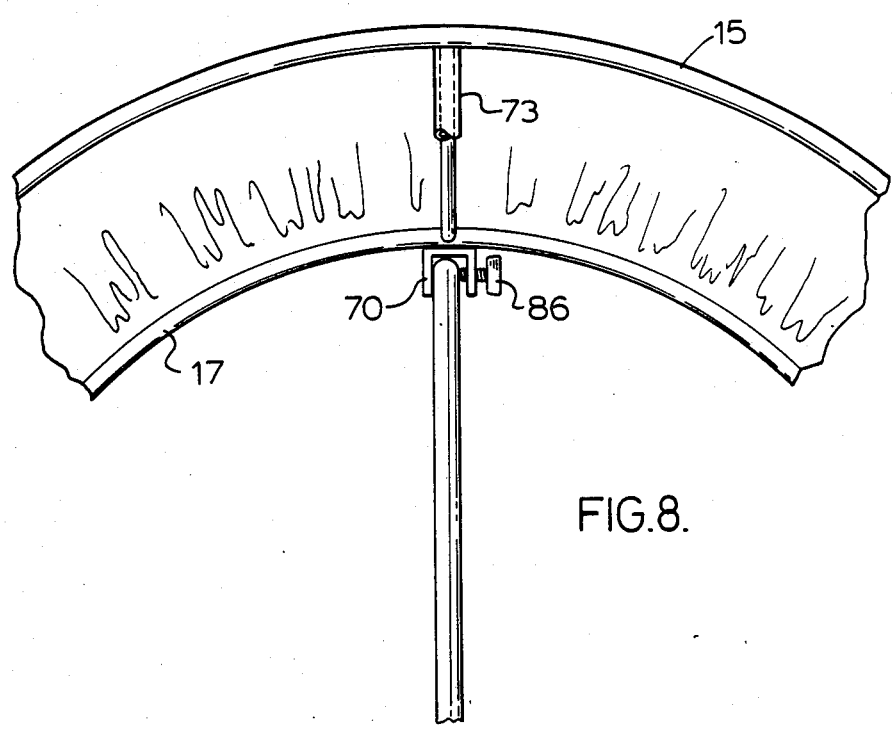

The vane F has a supporting frame including the struts 41 and 42 extending diagonally from wire frame 37, to join parallel bars 80 and 81 which, in turn, meet a perpendicular rod 83 extending between them. A fabric cover (not shown in FIGS. 7 and 8) fills the space within the frame 37. Thus the vane F constitutes a self-contained unit which is detachably connected to the frame 37.

This is done by sliding the parallel bars 80 and 81 into the channel members 70 and 71 and tightening set screws 86 to hold them in place.

Making the vane F as a separate unit and providing for the wind passage frame to be detachable from the mounting rod 35 makes the entire unit portable and readily mountable or dismountable.

I claim:
1. A wind indicator comprising:
   a tubular frame member having an open windward end spaced apart from an open leeward end, a tubular diaphragm covering said frame member and extending between said windward end and said leeward end, said frame member and diaphragm defining a wind passage extending between said open ends, vane means mounted in said frame member and projecting a substantial distance outwardly of said leeward end, said vane means being responsive to pressure of wind entering said passage at said windward end to align said passage in the wind direction, and support means connected to said frame member adapted to mount said frame member for rotatary movement in a horizontal plane, said diaphragm being expandible and contractible responsive to wind velocity in said passage to vary the effective size of said passage.

2. A wind indicator, as defined in clailm 1, in which said tubular frame member includes, a larger circular hoop for disposal in a vertical plane and a smaller ring held spaced from the larger hoop and concentric thereto by connecting struts, said vane means extending centrally and axially of said hoop and ring to maintain the passage facing windward.

3. A wind indicator, as defined in claim 2, in which said diaphragm includes a substantially cylindrical fabric slipcover whose windward side is connected to said hoop and whose leeward side is provided with elastic margins, said slipcover being pleated so that it may be gathered in by said elastic margins or spread out under wind pressure.

4. A wind indicator, as defined in claim 2, wherein said tubular diaphragm comprises a substantially frusto-concial tube made up of a plurality of side-by-side strips of fabric each having windward end connected to said hoop and a leeward end elastically connected about said ring, said tube being contained substantially frusto-concial condition by elastic against said frame member at low wind velocity and forced outward in response to higher wind velocity.

5. A wind indicator, according to claim 2, wherein said tubular diaphragm comprises an overall circular covering having one marginal part connected about said hoop and a pleated body extending over said struts towards said ring and having a margin provided with elastic means drawing it inwards against said struts to define said open leeward end, said covering being adapted under the force of the wind blowing throught the passage from said windward end to said leeward end to billow outwards so as to offer less resistance or to resile inwards under a lesser force of the wind.

* * * * *